(12) United States Patent
Gueugneaud

(10) Patent No.: US 6,805,372 B2
(45) Date of Patent: Oct. 19, 2004

(54) BICYCLE FORK AND PIVOT FOR SAME

(75) Inventor: Jean-Marc Gueugneaud, Saint Clair de la Tour (FR)

(73) Assignee: Time Sport International, Varennes Vauzelles (FR)

( * ) Notice: Subject to any disclaimer, the term of this patent is extended or adjusted under 35 U.S.C. 154(b) by 0 days.

(21) Appl. No.: 10/221,792

(22) PCT Filed: Mar. 30, 2001

(86) PCT No.: PCT/FR01/00960

§ 371 (c)(1),
(2), (4) Date: Sep. 17, 2002

(87) PCT Pub. No.: WO01/74654

PCT Pub. Date: Oct. 11, 2001

(65) Prior Publication Data

US 2003/0038449 A1 Feb. 27, 2003

(30) Foreign Application Priority Data

Apr. 5, 2000 (FR) .............................. 00 04320

(51) Int. Cl.⁷ .............................. B60K 19/32

(52) U.S. Cl. ..................................... 280/280; 280/279
(58) Field of Search ............................... 280/263, 270, 280/274, 276, 277, 279, 280, 281.1

(56) References Cited

U.S. PATENT DOCUMENTS 4,828,285 A  5/1989  Foret et al.

FOREIGN PATENT DOCUMENTS

DE  3804342 A1  8/1989
DE  29920238 U1  3/2000

*Primary Examiner*—Lesley D. Morris
*Assistant Examiner*—Matthew Luby
(74) *Attorney, Agent, or Firm*—Young & Thompson

(57) ABSTRACT

A bicycle includes fork head (2) from which two sleeves (3a,3b) branch off and, on the side opposite to the sleeves, a tubular pivot (4) including a lower cylindrical portion (4a) integral with the fork head, and an upper cylindrical portion (4b) for fixing a stem. The external diameter (Da) of the lower cylindrical portion (4a) of the pivot is larger than the external diameter (Db) of the upper cylindrical portion (4b) of the pivot, and a transitional zone (4c) links the two parts (4a,4b) with different diameters.

13 Claims, 3 Drawing Sheets

BICYCLE FORK AND PIVOT FOR SAME

BACKGROUND OF THE INVENTION

The invention relates to a bicycle fork of the kind comprising a fork crown from where there extend two fork stems and, on the opposite side to the fork stems, a tubular pivot comprising a cylindrical bottom part secured to the fork crown, and a cylindrical top part for securing a handlebar stem.

DESCRIPTION OF THE RELATED ART

It is known that, in a bicycle, the fork pivot is mounted to rotate in a bushing of the bicycle frame, generally by means of two rolling bearings provided one at the bottom and one at the top of the bushing. The cyclist, by acting on a handlebar fixed to the end of the handlebar stem, can thus steer the fork, and the front wheel, in a desired direction.

The connecting region linking the pivot and the fork crown constitutes a trouble spot and is particularly heavily mechanically loaded.

SUMMARY OF THE INVENTION

It is an object of the invention, above all, to provide a bicycle fork which, in the connecting region linking the fork crown and the pivot, has satisfactory rigidity and provides the best possible distribution of stress over the bearings, particularly at the bottom part of the pivot, without this resulting in an appreciable gain in the weight of the fork and of the steering gear.

According to the invention, a bicycle fork of the kind defined previously is characterized in that the outside diameter of the cylindrical bottom part of the pivot is greater than the outside diameter of the cylindrical top part of this pivot, and in that a transition region provides the link between the two, different-diameter, parts of the pivot.

This solution makes it possible to strengthen the connecting region linking the fork crown and the pivot, without in any way leading to an appreciable increase in weight because the top part of the pivot maintains a small outside diameter which involves no appreciable modification to the weight of the pivot and handlebar stem assembly.

As a preference, the transition region of the pivot has a frustoconical exterior surface, the outside diameter of which decreases from the bottom part toward the top part.

The fork is advantageously made of composite, preferably as a single piece with the pivot which is also made of composite.

The term "composite" is intended to mean a material consisting of fibers of high mechanical strength, particularly carbon or glass fibers, embedded in a resin matrix. Parts manufactured from such a material are generally molded.

As an alternative, the pivot may be made of metal, particularly of light alloy. The fork may also be made of metal.

The pivot may be manufactured separately, then assembled with the fork crown.

As a preference, the diameter of the top part of the pivot is equal to a standard bicycle pivot diameter, particularly 25.4 mm or 28.6 mm. The diameter of the bottom part of the pivot is at least 5% (five percent), and advantageously at least 12% twelve percent), greater than the diameter of the top part.

The pivot may have a cylindrical cavity of circular cross section, the diameter of which remains constant from the bottom to the top.

The exterior surface of the connecting region linking the pivot and the fork crown advantageously has a frustoconical surface to act as a support for a mating surface of an inner ring of a rolling bearing. In the case of a fork and of a pivot made of composite, the fibers of the composite are continuous in the connecting region.

The invention also relates to a bicycle fork pivot comprising a cylindrical bottom part for linking to a fork crown and a cylindrical top part for the attachment of a handlebar stem, characterized in that the outside diameter of the cylindrical bottom part of the pivot is greater than the outside diameter of the cylindrical top part of the pivot, and in that a transition region provides the link between the two, different-diameter, parts.

Advantageously, the transition region of the pivot has a frustoconical exterior surface, the diameter of which decreases from the bottom upward.

The invention also relates to a bicycle steering gear, particularly integrated steering gear, comprising a fork as defined previously.

When the bicycle steering gear comprises a fork with a connecting region linking the pivot and the fork crown which has a frustoconical exterior surface, the steering gear comprises, at the bottom part of the frame bushing, a rolling bearing, the inner ring of which has an oblique bearing surface mating with the frustoconical surface of the linking region.

BRIEF DESCRIPTION OF THE DRAWINGS

Apart from the provisions set out hereinabove, the invention consists in a certain number of other provisions which will be dealt with more fully hereinafter with regard to some exemplary embodiments which are described in detail with reference to the appended drawings but which are not in any way limiting. In the drawings.

DESCRIPTION OF THE PREFERRED EMBODIMENTS

Figures 1, 2:
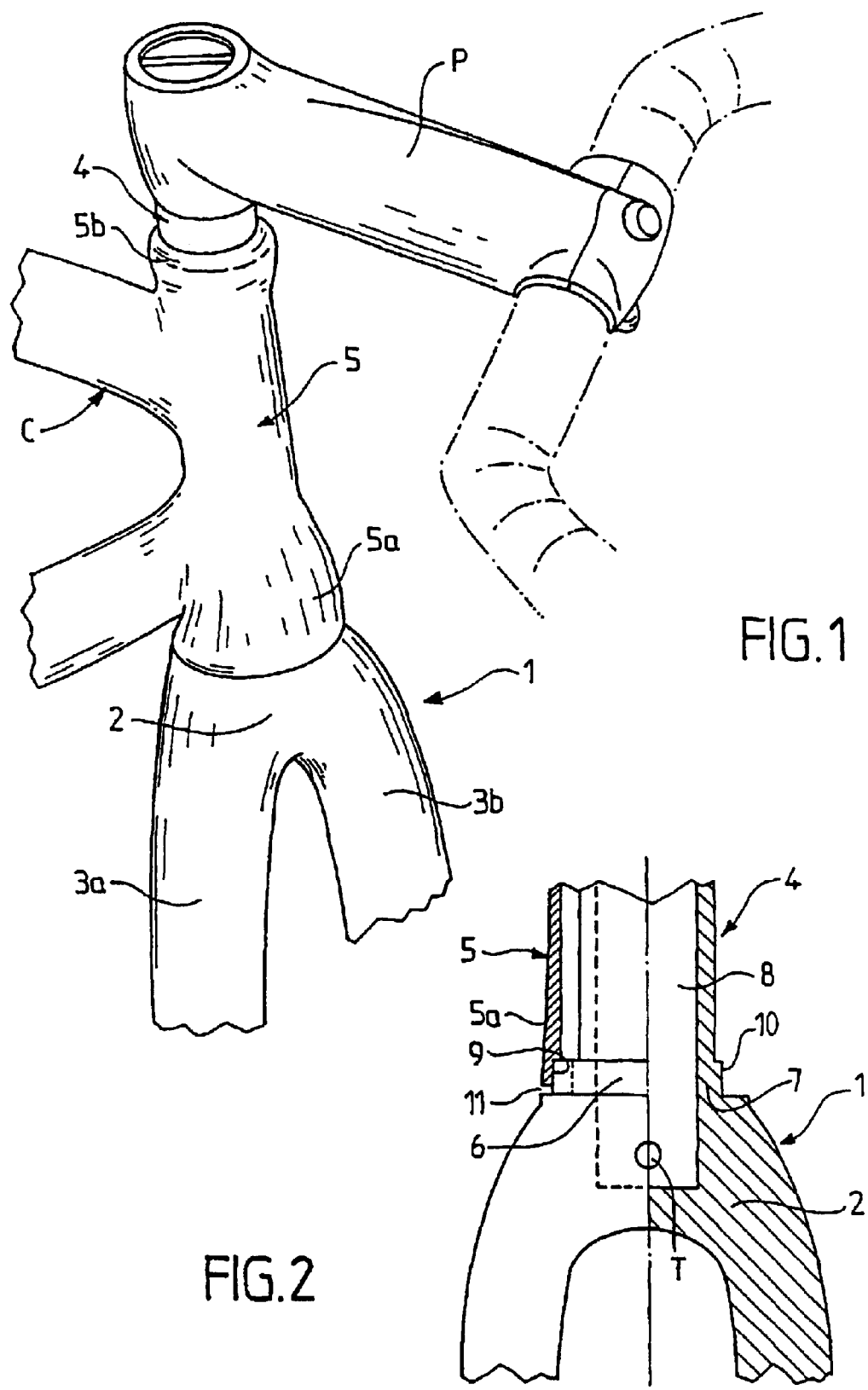
FIG. 1 is a schematic perspective view of a bicycle steering gear.
FIG. 2 is a vertical half section and an external half view of the connecting region linking the pivot and the fork crown according to the invention, depicted in part.

Reference to FIG. 1 of the drawings shows a bicycle fork 1 comprising a fork crown 2 from which two partially depicted fork stems 3a, 3b extend. In the customary way, each fork stem is equipped at its lower end (not visible) with a lug for attaching the axle of the front wheel which passes between the fork stems.

Figure 3:
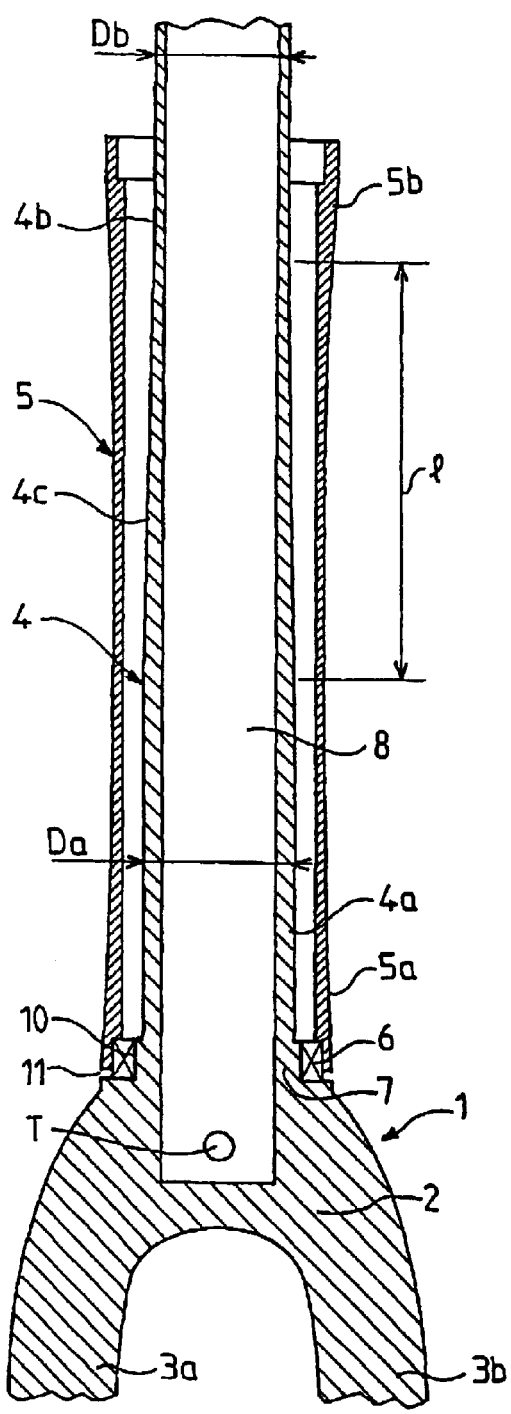
FIG. 3 is a vertical section, with partial cutaway, of the pivot and of the fork crown and of the bushing of the frame housing the pivot.
Figure 4:
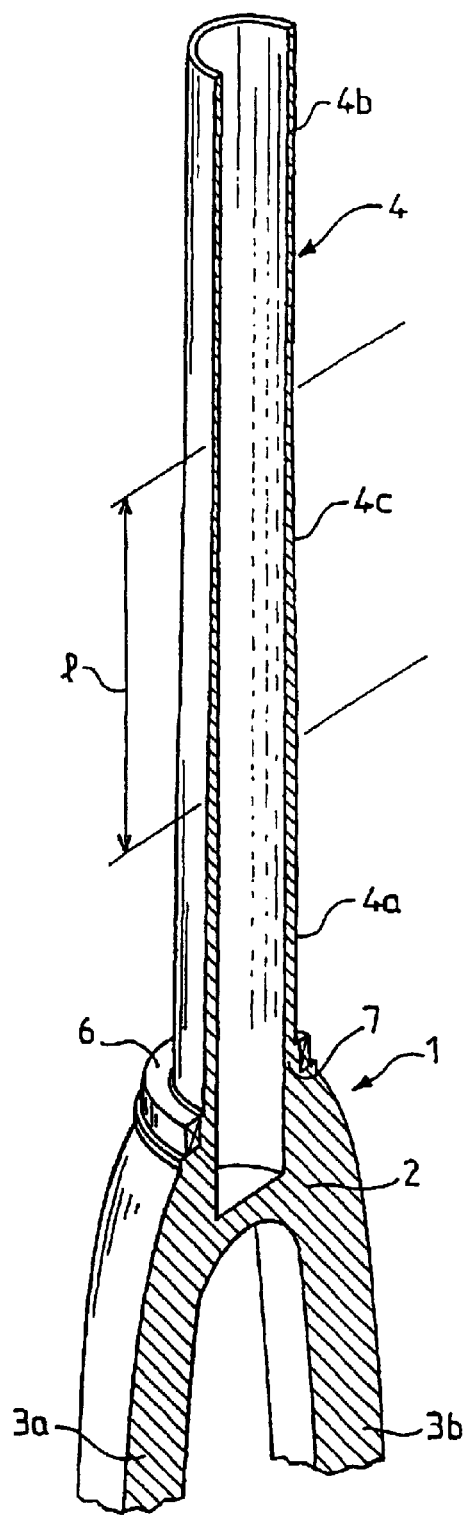
FIG. 4 is a perspective view of a vertical section of the fork partially depicted and of the pivot.

The fork 1 comprises a tubular pivot 4 which, as visible in FIGS. 3 and 4, comprises a cylindrical bottom part 4a of circular cross section secured to the fork crown 2 and a cylindrical upper part 4b of circular cross section for the attachment of a handlebar stem P. The outside diameter of the parts 4a, 4b is constant.

The expressions "bottom part", "top part", "bottom" and "top" must, of course, be understood as applying to a bicycle in the vertical position for riding.

The fork 1 is mounted to rotate in a bushing 5 of the bicycle frame C, generally via a first bearing provided at the bottom part between the bushing 5 and the pivot 4 and a second bearing (not depicted) provided at the top part of the bushing 5. In the example illustrated, the first bearing is formed of a rolling bearing 6, depicted schematically. In general, the second bearing is also formed of a rolling bearing. The two bearings may, however, be plain bearings.

The connecting region 7 linking the fork crown 2 and the pivot 4 constitutes a trouble spot at which the best possible distribution of stress is desired. The top part 4b of the pivot, on the other hand, is not as heavily stressed.

The outside diameter Da of the cylindrical bottom part 4a of the pivot is greater than the outside diameter Db of the top part 4b of the pivot. These two different diameters Da, Db are provided on one and the same piece, namely the pivot 4.

A transition region 4c provides the link between the two parts 4a, 4b. This transition region 4c has a frustoconical exterior surface, the diameter of which decreases from the bottom upward. The region 4c extends over a relatively long length 1, particularly a length in excess of 5 cm.

At the present time, there are two fork pivot outside diameters as standard in the field of cycling. A first diameter of 25.4 mm is generally used for on-road cycling, while a larger diameter of 28.6 mm is used for mountain bikes, the forks of which are subjected to higher stresses. This larger diameter of 28.6 mm allows for a better distribution of stress over the rolling bearings, and an appearance more in tune with frames with oversized tubes.

The diameter Db of the top part may be equal to one of the standard cycling pivot diameters, either 25.4 mm or 28.6 mm at the present time. Of course, the value of the diameter Db is not fixed and may be chosen to suit varying requirements, particularly to fit varying standards.

The diameter Da of the bottom part is preferably at least 5%, and advantageously at least 12%, greater than the diameter Db of the top part.

The larger diameter Da makes it possible, in the case of a fork made of composite, to cause more fibers to pass from the pivot 4 to the fork crown 2 in the connecting region 7 situated radially on the inside of the rolling bearing or bearing 6. In the case of a metal pivot 4, the larger diameter Da allows an increase in the moment of inertia and also improves fork behavior.

The pivot 4 has a cylindrical internal cavity 8 of circular internal cross section, the diameter of which remains constant along the entire length of the pivot. The variation in thickness of the pivot is due solely to the variation in the outside diameter. Toward the lower end of the cylindrical cavity 8, a hole T of axis perpendicular to the mid-plane of the fork passes through the fork crown, for the attachment of a brake caliper.

Two diametral partitions at right angles, forming a cross, may be provided in the housing 8 to strengthen the pivot, particularly when it is made of composite. The mid-plane of one of the partitions lies along the longitudinal plane of symmetry of the fork.

The fork 1 is advantageously designed for integrated steering, illustrated in FIGS. 1 to 3. The steering cups of the lower and upper rolling bearings, invisible, are housed in the larger-diameter ends 5a, 5b of the bushing 5.

An interior bearing surface 9 (FIG. 2) is machined in the lower end 5a for supporting the outer ring of the rolling bearing 6. The inner ring of this rolling bearing is supported against an interior bearing surface 10 machined on the crown 2 at the base of the pivot 4. There is a minimum clearance 11 between the lower edge of the bushing 5 and the fork crown.

The pivot of the invention makes it possible to maintain the advantages of the larger diameter at the connection with the fork crown without adding excessive weight because it is possible, at the top part, to mount a handlebar stem corresponding to a smaller pivot diameter which is sufficient for the stresses there are at this point.

The rolling bearing 6 is advantageously manufactured in compact form so as to make it possible, using the same rolling bearing, to produce a steering gear using either a pivot of constant outside diameter for on-road cycling, generally a diameter of 25.4 mm, or a pivot of constant outside diameter for mountain bikes, generally a diameter of 28.6 mm, or the pivot according to the invention. For that, the inner ring of the rolling bearing has an inside diameter designed for the largest-diameter pivot and an outside diameter compatible with a frame bushing associated with a small-diameter pivot, for on-road cycling.

Figure 5:
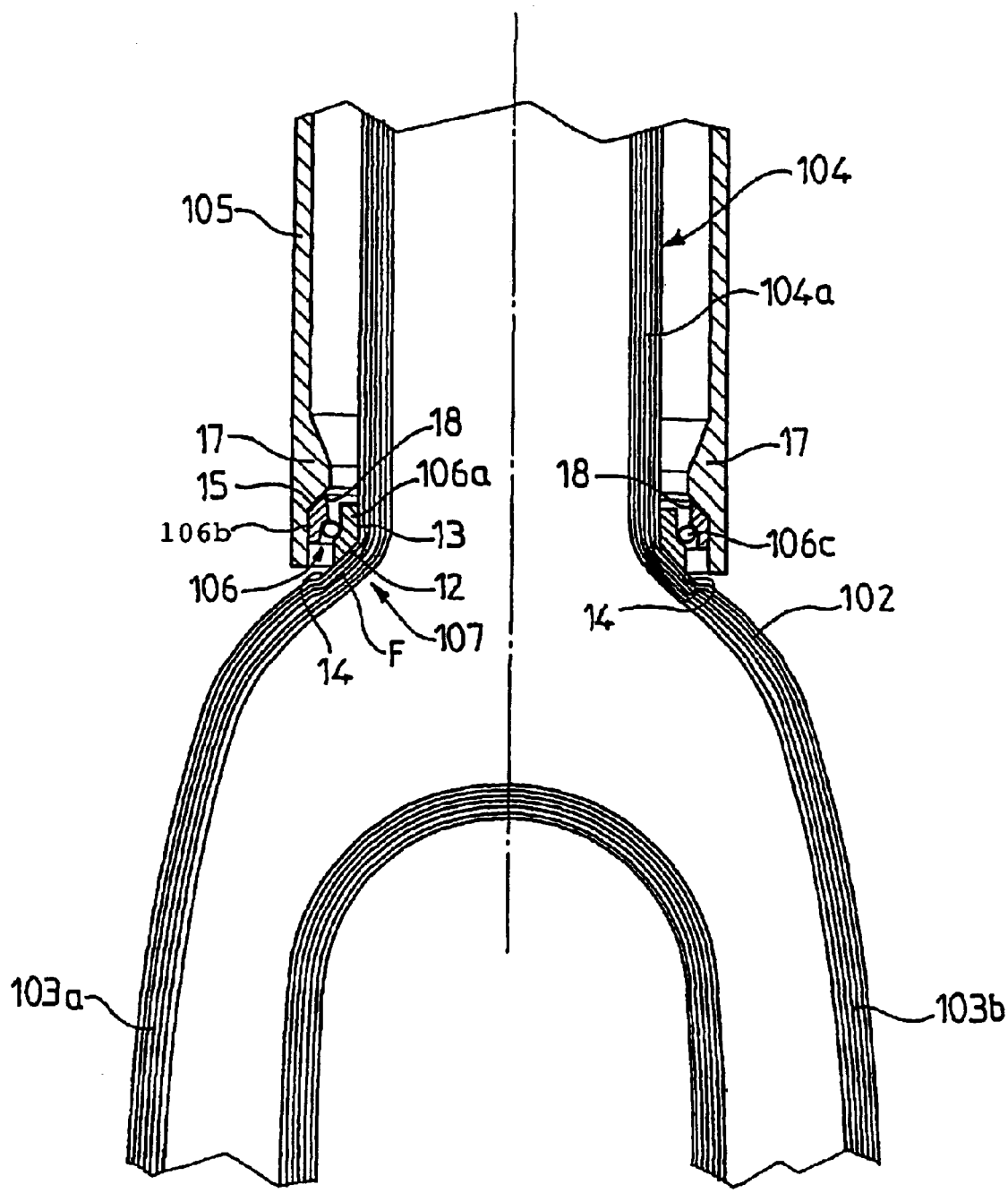
FIG. 5, finally, is a schematic vertical section of an alternative form of the connecting region linking the pivot and the fork crown.

Referring to FIG. 5, it is possible to see a particularly advantageous alternative form of embodiment of the connecting region 107 linking the pivot 104 and the fork crown 102. The various elements have roles similar to elements already described previously and are denoted by a reference equal to the sum of the previous reference and the number 100.

In FIG. 5, only the bottom part 104a of the pivot is depicted. The outside diameter of the top part (not depicted) of the pivot 104 is smaller than that of this bottom part 104a.

The rolling bearing 106 comprises an inner ring 106a, an outer ring 106b, and rolling bodies 106c, particularly balls, arranged between raceways provided in the rings.

The inner ring 106a has, toward the inside in the radial direction, a frustoconical oblique lower bearing surface 12, the generatrices of which are inclined with respect to the geometric axis of the rolling bearing, advantageously at an angle of 45°. The inner surface in the radial direction of the ring 106a is extended upward, beyond the small base of the frustoconical surface 12, by a cylindrical surface 13, the inside diameter of which has the same value as the outside diameter of the part 104a of the pivot which acts as a guide.

The exterior surface of the part 104a is extended downward by a frustoconical surface 14, the diameter of which increases downward. The frustoconical surface 14 belongs to the exterior surface of the connecting region 107. The inclination of the generatrices of the surface 14 to the geometric axis of the fork is the same as that of the generatrices of the surface 12 which presses and abuts against the surface 14.

The outer ring 106b has an outer surface, in the radial direction, comprising a top part 15 with a frustoconical exterior surface, the diameter of which decreases upward, and a cylindrical bottom part 16 of the same diameter as the internal cylindrical surface of the bushing 105 of the frame. The inclination of the generatrices of the surface 15 to the geometric axis of the rolling bearing is advantageously 45°. A shoulder 17 projecting toward the inside of the bushing 105 is provided with a frustoconical bearing surface 18 which mates with the surface 15 which presses against it.

The connecting region 107 with oblique surface 14 provides a gradual transition from the bottom part 104a of the pivot to the fork crown 102. In the case of a pivot 104 and a fork crown 102 made of a single piece of composite it is possible, by the oblique bearing of the surfaces 12 and 14 one on the other, to pass numerous continuous fibers F under the rolling bearing 106, from the pivot 104 to the fork crown 102. This avoids machining a bearing surface such as 10 in FIG. 2, with the cutting of fibers.

The continuity of the fibers F is favorable to the mechanical strength of the connection between the pivot 104 and the fork crown 102. Furthermore, the bearing surface 14 on the fork crown, for the rolling bearing 106, can be obtained directly by molding.

The rolling bearing 106 can be produced in compact form with an inside diameter of the inner ring 106a as large as possible to allow a great many fibers F to be passed through the connecting region 107. The stress level is thus reduced in the fragile section, and safety is enhanced. According to an advantageous, but not limiting, exemplary embodiment, the outside diameter of the rolling bearing 106 is equal to 42 mm, and its inside diameter is equal to 33 mm.

When a plain bearing is installed in place of the rolling bearing 6, 106, all of the above remains valid.

The fork according to the invention, the pivot of which is combined with a compact rolling bearing 6, 106 or a plain bearing, also offers freedom in the construction of the bicycle. The fork may be chosen independently of the bushing 5, 105, making it possible to devise a range by altering the diameter of the bushing while at the same time using the same rolling bearing 6, 106. Better mechanical behavior is obtained, and integrated steering can be used on certain current frames.

What is claimed is:

1. A bicycle fork, comprising:
    a fork crown (2);
    two fork stems (3a, 3b) extending from the fork crown; and
    on a side of the fork crown opposite a side with the two fork stems, a tubular pivot (4, 104),
    the pivot comprising
    a cylindrical bottom part (4a, 104a) secured to the fork crown,
    a cylindrical top part (4b) for securing a handlebar stem without need of a supplemental piece fixed to the fork crown, and
    a transition region (4c) linking the top part and the bottom part,
    an outside diameter (Da) of the cylindrical bottom part (4a, 104a) being greater than an outside diameter (Db) of the cylindrical top part (4b), and
    the pivot having a frustoconical exterior surface, the outside diameter of the frustoconical exterior surface decreasing from the bottom part upward towards the top part,
    the fork crown (2), the two fork stems (3a, 3b) and, the pivot comprising a single piece made of composite material.

2. The bicycle fork as claimed in claim 1, characterized in that the diameter (Db) of the top part of the pivot is equal to a standard bicycle pivot diameter.

3. The bicycle fork as claimed in claim 1, characterized in that the diameter (Da) of the bottom part (4a, 104a) of the pivot is at least 5% (five percent) greater than the diameter (Db) of the top part.

4. The bicycle fork as claimed in claim 3, characterized in that the diameter (Da) of the bottom part (4a, 104a) of the pivot is at least 12% (twelve percent) greater than the diameter (Db) of the top part.

5. The bicycle fork as claimed in claim 1 characterized in that the pivot (4) has a cylindrical cavity (8) of circular cross section, the diameter of which remains constant from the bottom to the top.

6. The bicycle fork as claimed in claim 1, characterized in that the exterior surface of a connecting region (107) linking the pivot (104) and the fork crown (102) has a frustoconical surface (14) to act as a support for a mating surface of an inner ring of a rolling bearing.

7. The bicycle fork as claimed in claim 1, characterized in that the exterior surface of a connecting region (107) linking the pivot (104) and the fork crown (102) has a frustoconical surface (14) to act as a support for a mating surface of an inner ring of a rolling bearing and in that fibers (F) of the composite material are continuous in the connecting region (107), from the pivot (104) to the fork crown (102).

8. A bicycle steering gear, comprising a fork as claimed in claim 1.

9. A bicycle steering gear, comprising a fork as claimed in claim 6, and, at the bottom part of a frame bushing, a rolling bearing (106), the inner ring (106a) of which rolling bearing has an oblique bearing surface (12) mating with the frustoconical surface (14) of the linking region (107).

10. A bicycle steering gear, comprising a fork as claimed in claim 7, and, at the bottom part of the frame bushing, a rolling bearing (106), the inner ring (106a) of which roller bearing has an oblique bearing surface (12) mating with the frustoconical surface (14) of the linking region (107).

11. The bicycle fork as claimed in claim 2, characterized in that the diameter (Db) of the top part of the pivot is one of 25.4 mm and 28.6 mm.

12. A bicycle fork, comprising:
    a fork crown (2) with two fork stems (3a, 3b) extending from a first end of the fork crown and a tubular pivot extending from a second end of the fork crown, opposite the first end,
    the pivot comprising a cylindrical bottom part (4a, 104a), a cylindrical top part (4b) for securing handlebars, and a transition region (4c) linking the top part and the bottom part,
    an outside diameter (Da) of the cylindrical bottom part (4a, 104a) being greater than an outside diameter (Db) of the cylindrical top part (4b),
    the pivot having a frustoconical exterior surface, the outside diameter of the frustoconical exterior surface progressively decreasing from the bottom part upward towards the top part, wherein,
    the fork crown (2), the two fork stems (3a, 3b) and, the pivot comprise a single piece of composite material.

13. A bicycle fork, comprising:
    a single piece, composite material tubular pivot and fork crown,
    the fork crown merged, at a first end, with two fork stems and, at a second opposite end, with the tubular pivot,
    the pivot having a reducing wall thickness from a cylindrical bottom part, located at the second end, toward a cylindrical top part,
    the top part providing a mounting surface for mounting a handlebar stem.

* * * * *